United States Patent
Amann et al.

(10) Patent No.: US 9,672,070 B2
(45) Date of Patent: Jun. 6, 2017

(54) EFFICIENT VALIDATION OF RESOURCE ACCESS CONSISTENCY FOR A SET OF VIRTUAL DEVICES

(71) Applicant: International Business Machines Corporation, Armonk, NY (US)

(72) Inventors: Stefan Amann, Boeblingen (DE); Gerhard Banzhaf, Nufringen (DE); Ralph Friedrich, Sindelfingen (DE); Muthumanikandan Nambi, Bengaluru (IN); Kishore Kumar G. Pillai, Bangalore (IN); Parakh P. Verma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 14/572,839

(22) Filed: Dec. 17, 2014

(65) Prior Publication Data

US 2016/0179579 A1   Jun. 23, 2016

(51) Int. Cl.
G06F 9/455 (2006.01)
G06F 9/46 (2006.01)
G06F 9/50 (2006.01)

(52) U.S. Cl.
CPC ........ G06F 9/5011 (2013.01); G06F 9/45558 (2013.01); G06F 2009/45579 (2013.01); G06F 2009/45587 (2013.01)

(58) Field of Classification Search
None
See application file for complete search history.

(56) References Cited

U.S. PATENT DOCUMENTS

| | | | |
|---|---|---|---|
| 7,512,133 B2 | 3/2009 | Dugan et al. | |
| 7,739,415 B2 | 6/2010 | Banzhaf et al. | |
| 7,970,852 B2 | 6/2011 | Allen et al. | |
| 8,228,797 B1* | 7/2012 | Utley | H04L 12/5693 370/235 |
| 8,510,815 B2 | 8/2013 | Sekiguchi et al. | |
| 2007/0230477 A1* | 10/2007 | Worley | G06F 9/5016 370/395.3 |

(Continued)

FOREIGN PATENT DOCUMENTS

WO   2010060721 A1   6/2010

OTHER PUBLICATIONS

U.S. Appl. No. 14/311,440, entitled "Flexible Deployment and Migration of Virtual Machines", filed Jun. 23, 2014.

(Continued)

*Primary Examiner* — Lewis A Bullock, Jr.
*Assistant Examiner* — Melissa Alfred
(74) *Attorney, Agent, or Firm* — Steven F. McDaniel

(57) ABSTRACT

Validating access consistency to a set of accessed resources over a set of virtual ports, including determining a number of virtual ports to provision, allocating each physical port and each virtual port among two or more buckets, and validating access to the set of accessed resources via each virtual port over each physical port that is allocated to the same bucket. At least one virtual port in the set of virtual ports shares no bucket with at least one physical port in the set of physical ports, and each virtual port is only validated over each physical port with which the virtual port shares a bucket.

20 Claims, 7 Drawing Sheets

(56) References Cited

U.S. PATENT DOCUMENTS

| | | | |
|---|---|---|---|
| 2007/0289017 A1* | 12/2007 | Copeland | G06F 21/552 |
| | | | 726/23 |
| 2012/0131176 A1* | 5/2012 | Ferris | G06F 9/5072 |
| | | | 709/224 |
| 2012/0185852 A1 | 7/2012 | Scales et al. | |
| 2013/0097295 A1 | 4/2013 | Garza et al. | |
| 2013/0263130 A1 | 10/2013 | Sugihara | |

OTHER PUBLICATIONS

U.S. Appl. No. 14/510,159, entitled "Managing Virtual Network Ports", filed Oct. 9, 2014.

* cited by examiner

EFFICIENT VALIDATION OF RESOURCE ACCESS CONSISTENCY FOR A SET OF VIRTUAL DEVICES

BACKGROUND OF THE INVENTION

The present invention relates generally to the field of networking, and more particularly to resource access for virtual devices in a cluster having network-attached resources.

Conventional networked computing environments for deployment and migration of virtual servers with storage area network (SAN)-attached storage are set up as follows. A cluster of physical servers (PSs) is configured with a hypervisor such that each PS hosts multiple virtual machines, referred to herein as virtual servers (VSs). The VSs access SAN-attached storage devices via physical host bus adapters (HBAs) connected to the hosting PSs. The VSs are flexibly deployed on different PSs and can be migrated among the PSs within the PS cluster.

The PSs and storage devices are connected via SANs. A SAN may be made up of one or more switches, and may be based on a communications protocol such as Fibre Channel (FC), Fibre Channel over Ethernet (FCoE), Internet Small Computer System Interface (iSCSI), AT Attachment (ATA) over Ethernet (AoE), or HyperSCSI, to name a few. In the case of Fibre Channel, the PSs and storage controllers access an FC-SAN via the HBAs, where each HBA has a so-called World-Wide Port Name (WWPN) that is unique within the scope of the network. The FC-SAN-attached storage devices are identified by logical unit numbers (LUNs).

Access to the storage devices on the SAN is controlled via zoning and LUN masking. Zoning defines which ports are able to communicate, including the FC switch ports. LUN masking defines which HBAs can access a particular LUN, with each HBA identified according to its unique WWPN.

In a VS environment, the HBAs are conventionally virtualized such that each HBA represents one or more virtual HBAs (vHBAs). Many HBA virtualization techniques exist, including: (i) single root I/O virtualization (SR-IOV) (an extension to the Peripheral Component Interconnect Express (PCIe) standard); (ii) proprietary methods; and (iii) N_Port ID Virtualization (NPIV). N_Port ID Virtualization is a FC facility allowing multiple FC node port (N_Port) IDs to share a single physical N_Port. Among other advantages, NPIV allows multiple FC initiators to occupy a single physical port, easing hardware requirements in SAN design, especially in environments where virtual SANs are used.

SUMMARY

According to an aspect of the present invention, there is a method, computer program product and/or system for validating access consistency to a set of accessed resources over a set of virtual ports that performs the following (not necessarily in the following order): (i) defines a resource access group, including: (a) a first set of virtual resources, (b) a first set of physical resources, (c) a first set of physical ports, and (d) a first set of accessed resources; (ii) provisions a first set of virtual ports for the resource access group; (iii) allocates each physical port in the first set of physical ports and each virtual port in the first set of virtual ports among two or more buckets; and (iv) validates access to the set of accessed resources via each virtual port over each physical port allocated to the same bucket as that virtual port. At least one virtual port in the set of virtual ports shares no bucket with at least one physical port in the set of physical ports. At least two physical ports in the set of physical ports are allocated to the same bucket. Each virtual port is only validated over each physical port with which the virtual port shares a bucket. At least one validation is performed for every virtual port in the set of virtual ports and for every physical port in the set of physical ports.

DETAILED DESCRIPTION

Figure 1:
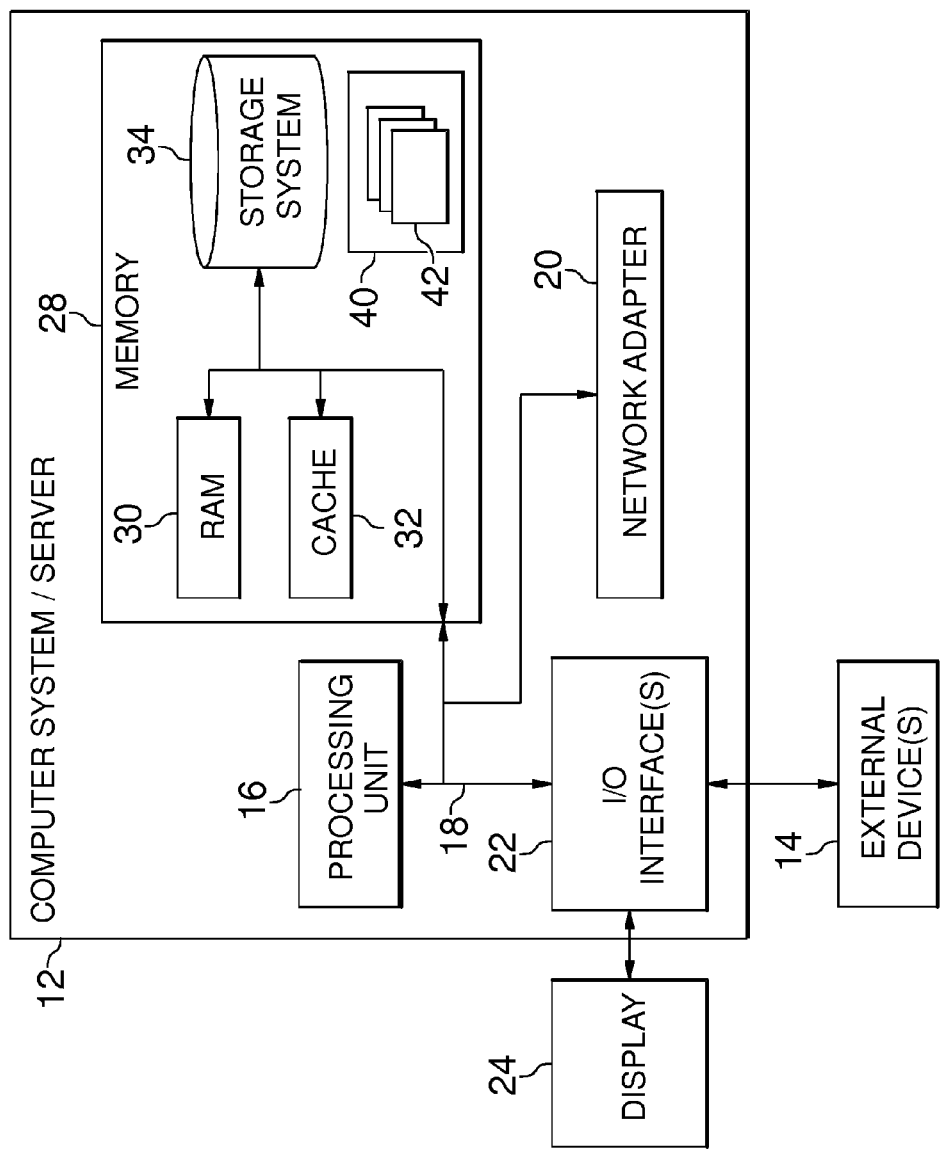
FIG. 1 depicts a cloud computing node used in a first embodiment system according to the present invention.

Some embodiments of the present invention validate consistent access to a set of resources for a set of virtual resources over a set of virtual ports and a set of physical ports by allocating the virtual ports and physical ports into buckets and validating virtual port resource access over only those physical ports placed into the same bucket. This approach is more efficient than the conventional alternative of validating every possible virtual-physical port pair. In some embodiments of the present invention, even greater efficiencies are obtained by dividing the virtual ports placed in the same bucket into multiple groups, pairing each group with a physical port from the same bucket, performing the validations of each group in parallel over their respectively paired physical ports, then changing the pairings until all virtual ports have been validated over all physical ports in the same bucket.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
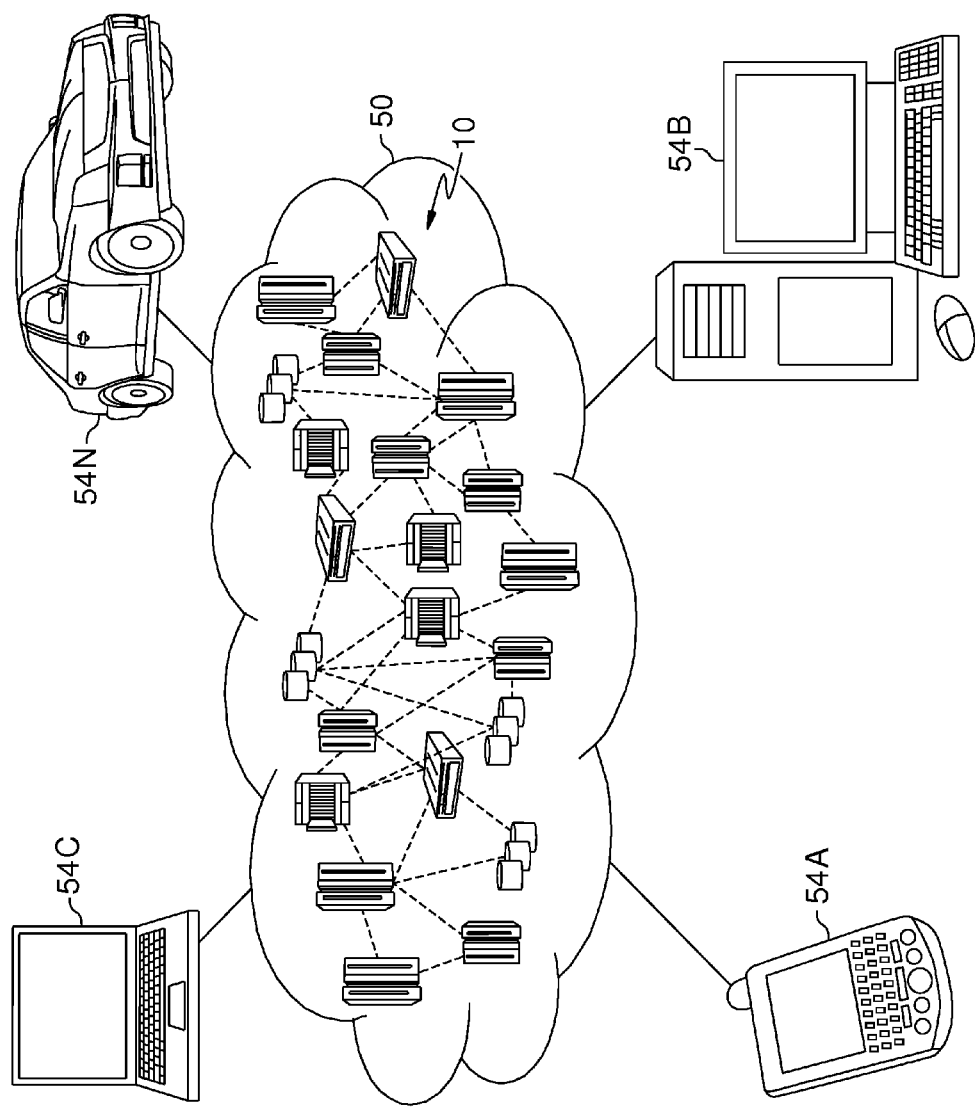
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
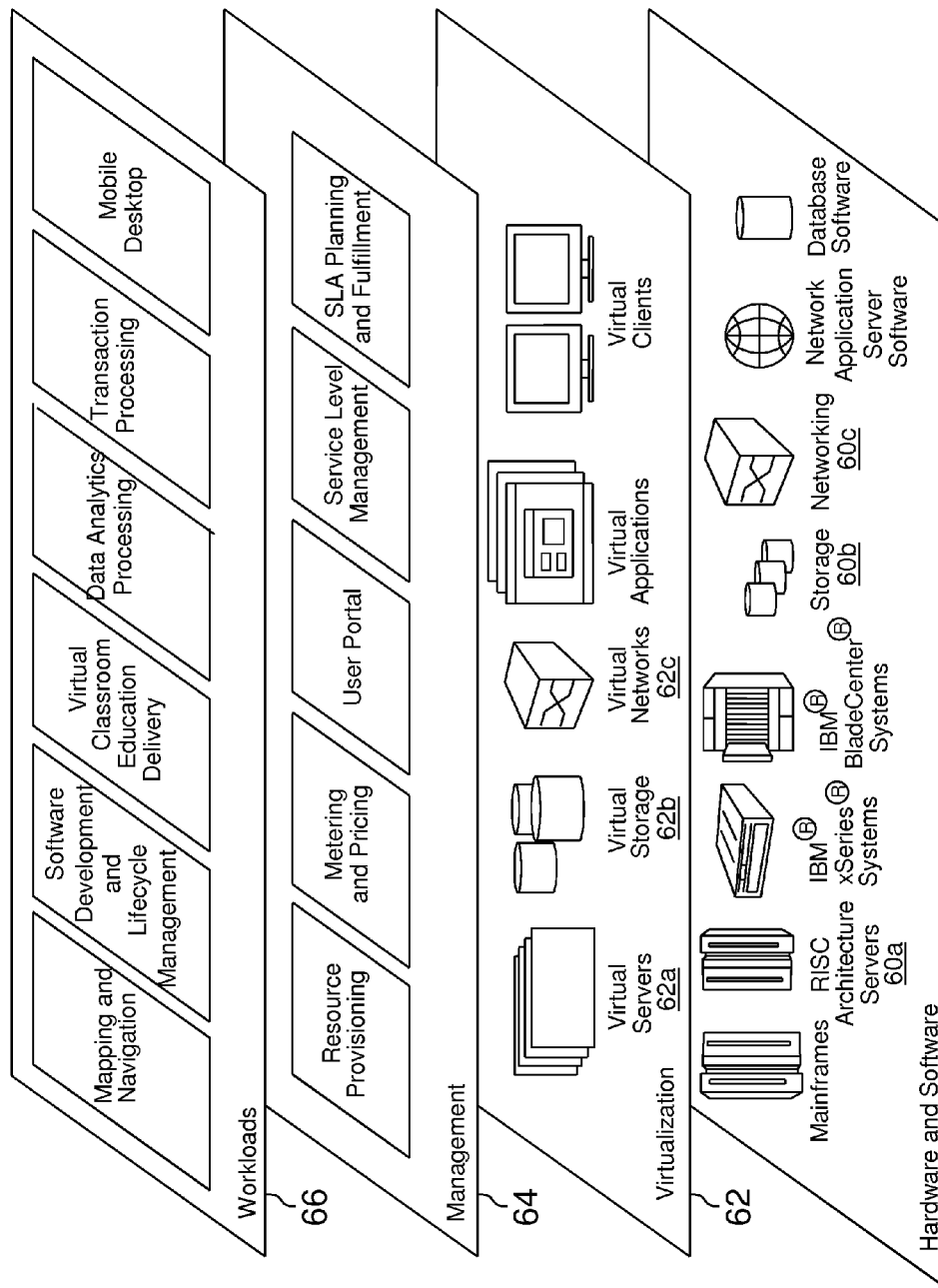
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop applications.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 4:
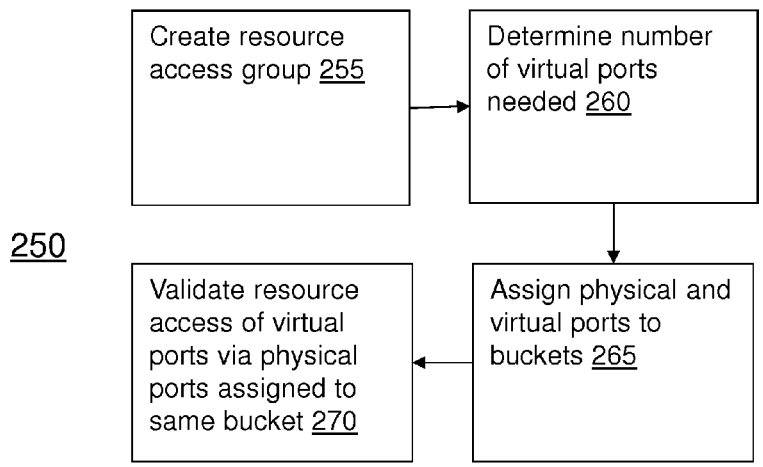
FIG. 4 is a flowchart showing a first embodiment method performed, at least in part, by the first embodiment system.
Figure 5:
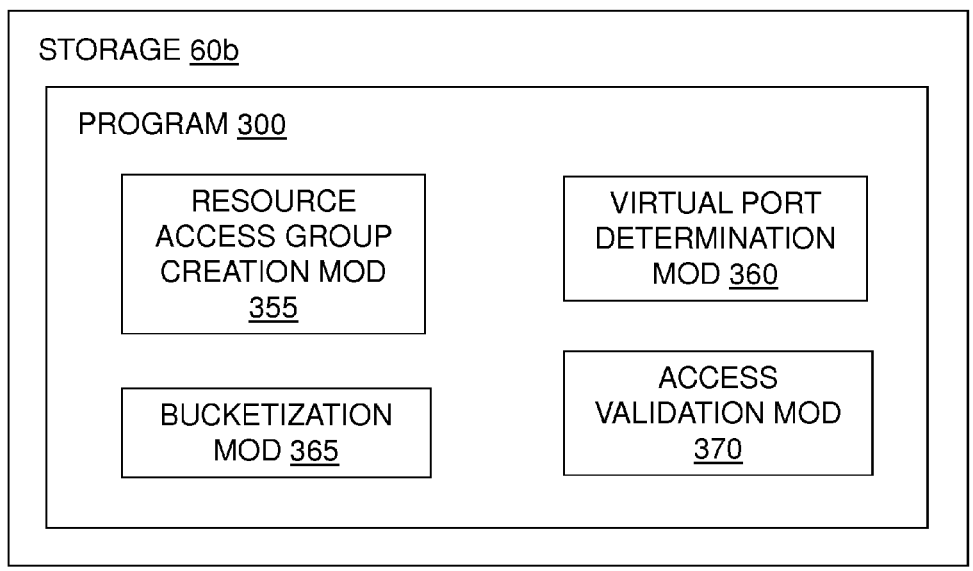
FIG. 5 is a block diagram view of a machine logic (for example, software) portion of the first embodiment system.

FIG. 4 shows flowchart 250 depicting a method according to the present invention. FIG. 5 shows program 300 for performing at least part of the method of flowchart 250. This method and associated software will now be discussed, over the course of the following paragraphs, with extensive reference to FIG. 4 (for the method blocks) and FIG. 5 (for the software blocks). As shown in FIG. 5, one physical location where program 300 may be stored is in storage block 60b (see also FIG. 3).

Processing begins at block 255, where resource access group creation module ("mod") 355 creates a resource access group (RAG) based on user input. A RAG includes, but need not be limited to: (i) a first set of virtual resources (VR), such as one or more virtual servers 62a or virtual storage devices 62b (see FIG. 3); (ii) a first set of physical resources and/or lower-level virtual resources (PR) on which the elements of VR run, such as one or more physical RISC architecture servers 60a or physical storage devices 60b; (iii) a first set of virtual communications ports (VP) (for example, endpoint components of virtual networks 62c) for access to one or more real and/or virtual networks by the elements of VR; (iv) a first set of physical and/or lower-level virtual communications ports (PP) (for example, endpoint components of physical networking 60c) for access to one or more real and/or virtual networks by the elements of PR; and (v) one or more other sets of real and/or virtual resources (R2), such as clients, servers, storage, network devices, printers, applications, user interface devices, and so on that the elements of VR should be able to access. Note that in some cases, R2 may be defined implicitly—that is, as the consistent set of resources that some threshold number of elements of VR are able to access (for example, if 2 of 3 elements of VR can access the same set of resources, it may be inferred that such set is R2 and a misconfiguration has resulted in an inconsistent resource set for the third element).

In this example embodiment of the present invention, the RAG is a storage access group (SAG) that includes part of a server cluster. This SAG in turn includes: (i) two virtual servers VS1 and VS2 as VR; (ii) two physical servers PS1 and PS2 as PR; (iii) virtual ports (in this example, defined later) as VP; (iv) three physical ports, PP1, PP2, and PP3 as PP; (v) SAN-attached storage resources as R2; and (vi) one SAN. In this example, the virtual ports are the means by which the virtual servers access the SAN-attached storage (see FIG. 6, described in further detail in Sub-Section III of this Detailed Description, for a pictorial representation for how these classes of components fit together in the examples provided herein). The server cluster is defined according to the system requirements for deploying virtual servers. Again note that, in some embodiments, some elements of a SAG, such as the elements of R2, may be defined implicitly.

A storage access group (SAG), as defined in the present invention, is a logical construct containing, but not necessarily limited to: (i) all virtual servers that shall have equivalent access to a particular set of storage resources; (ii) the physical ports that can be used to establish a connection to these storage resources, where these ports can be installed on one or multiple physical servers; and (iii) the set of unique identifiers (virtual ports) that can be assigned to the physical ports in order to access the storage resources. SAGs can be used, for instance, as a communication vehicle between server, SAN, and storage administrators to set up a consistent set of access rights in the SAN and storage controller(s), and accordingly set up virtual port configurations on the server side. Without SAGs, individual identifiers with specific access requirements would have to be communicated between these three classes of administrators, where the meaning and purpose of each individual identifier may not be obvious. It is within the server cluster that virtual machines are authorized to migrate. In some embodiments of the present invention, the entire networked computers system is defined as the server cluster.

The user in this example is a single systems administrator, but in other embodiments may include groups of users, other types of users, or even a non-human user or users that automatically define a RAG configuration based on a particular set of conditions and/or constraints.

Processing proceeds to block 260, where virtual port determination mod 360 determines the number of virtual ports VP of the RAG and provisions the specific port identifiers to be used. This may be done in various ways, such as according to a specific formula, rule, and/or the specific configuration and constraints of the other elements of the RAG. The example embodiments of Sub-Section III of this Detailed Description, for example, use a particular formula to determine the number of virtual ports to allocate. Here, the number of ports provisioned is based on a different formula, namely: $|VP|=|VS|\times|PP|\times2$, so $2\times3\times2=12$ virtual ports are reserved. In some embodiments, $|VP|$ is dynamic and changes based on changes to the rules governing the RAG or changes to the RAG's elements. For instance, $|VP|$ may change if an element is added to or removed from VR, PR, or PP, or if, say, the number of concurrent migrations of elements of VR across the elements of PR to be supported is changed. In some embodiments, some or all of the functionality of this block may instead be performed by a user.

Processing proceeds to block 265, where bucketization mod 365 allocates the elements of VP and PP into buckets, creating a fixed association between the group of VPs and the group of PPs in the same bucket. Like the number of virtual ports, determination of the number of buckets $|B|$ to use and the assignment of VP and PP elements into those buckets may be done in many ways. In this example embodiment, these objectives are met as follows: (i) $|B|$ is selected to be $|PP|-1$, so two buckets are used; (ii) one unique element of PP is assigned to each bucket, with the remaining element of PP assigned randomly to one of the two buckets; and (iii) elements of VP are assigned to each bucket in a round-robin fashion without replacement until all elements of VP have been assigned to one bucket, leading in this case to 6 elements of VP being assigned to each bucket. Sub-Section III of this Detailed Description illustrates a different approach (though one that would also result in two buckets for the scenario in this example).

Processing proceeds to block 270, where access validation mod 370 validates equivalent access to the elements of R2 by each of the elements of VP. This is to ensure that any element of VR in the RAG, using any element of VP, has the same access to R2 as would any other element of VR using any element of VP. However, because of the fixed association between the VPs and PPs created by bucketization, each element of VP only has to be validated in conjunction with each PP in the same bucket, whereas conventionally each VP would be validated in conjunction with every element of PP.

The bucketization approach can improve validation efficiency while providing the same service guarantees. Here, this means the six VPs in each bucket are validated over the 1 or 2 elements of PP in that same bucket, for a total of (6×2)+(6×1)=18 validations (instead of 12×3=36 validations).

In scenarios with more than one physical port in any bucket, an additional efficiency can be obtained by performing validations in parallel. For instance, here one bucket in the above example contains two PPs, PP1 and PP2. The six VPs in that bucket can be divided, say, into two groups of three, with the one group validated over PP1 while the other is validated over PP2, and vice versa. Note also that while the members of the buckets and groupings in these example embodiments are mutually exclusive, this need not necessarily be the case: as long as there is at least one element of VP that does not share any bucket with at least one element of PP, validation efficiencies can be achieved. Finally, note that while the above examples involve validation of virtual ports for virtual server access to storage resources, some embodiments of the present invention may be used in other RAG scenarios (for instance, validation of virtual ports for virtual storage access to virtual servers—the reverse of the examples given herein).

III. Further Comments and/or Embodiments

Some embodiments of the present invention recognize the following facts, potential problems and/or potential areas for improvement with respect to the current state of the art: (i) within a Fibre Channel (FC) Storage Access Group (SAG), as defined herein, a group of World-Wide Port Names (WWPNs) which are not being used by any host for fibre login and are free should have a consistent view of storage resources; (ii) this consistency should be maintained under all circumstances, including the case of migration of a virtual server (VS) (using one or more of those WWPNs for their virtual host bus adapter(s) (vHBA(s)) from one hypervisor to another); (iii) the source and target hypervisors may be hosted on the same or different physical servers (PSs), and hence the storage access may be through different physical HBA ports at different points in time during the lifecycle of a VS; and/or (iv) there may be multiple ways of ensuring and validating the consistency of the list of accessible storage resources for all the VSs in a SAG.

Some embodiments of the present invention may therefore include one, or more, of the following features, characteristics and/or advantages: (i) a strategy to ensure and/or validate the consistency of the list of accessible storage resources for all the VSs in a SAG in an optimal way without violating SAG principles; (ii) a method to organize the WWPNs that would be used by the vHBA ports of the VSs in a certain manner; and/or (iii) a set of rules to be used while performing a fibre login using a certain WWPN over the physical HBA port of an underlying PS on which a hypervisor is deployed, wherein the login process uses the WWPN organizational outcome of (ii), which (a) helps to limit the number of fibre logins required for consistency validation, (b) helps to achieve concurrency while validating storage access consistency for each of the WWPNs, and/or (c) adds an advantage in terms of time and/or performance while ensuring storage access consistency for the SAG.

In some embodiments of the present invention, a user defines one or more SAGs consisting of: (i) groups of storage devices (logical unit numbers, or LUNs) with identical access characteristics; (ii) VSs that need access to each group of LUNs; and/or (iii) HBAs (that is, the physical port(s) of each HBA) used to access these LUNs. The system creates vHBAs with WWPNs for each SAG and enables the export of WWPNs per SAG. A storage area network (SAN) Administrator performs SAN and storage controller configuration on the SAG base, which may include zoning and/or LUN masking. The system allows validation of access capability for all vHBAs of a SAG.

The use of SAGs can significantly simplify storage management in an enterprise-class environment. It is an advanced SAN-management technique that can be used in a cluster and virtual server environment supporting large numbers of PSs, VSs, HBAs, storage resources, SANs, and so forth. SAGs make it easy to add or remove storage resources, HBAs, virtual servers, and the like, manage virtual network ports, and support dedicated and shared storage access and flexible VS deployment and migration among PSs in a cluster. SAGs also provide a bridge between server and storage administration domains. In some embodiments, SAGs require one WWPN per each VS and each HBA on each PSs where the VS shall be able to run, with access verification performed at startup time and/or prior to any VS migration.

To better visualize a SAG, consider the following simple example, beginning with a SAN that includes the following components: (i) three VSs: VS1, VS2, and VS3; (ii) two PSs: PS1 and PS2, each of which run a hypervisor; (iii) two HBAs: A and B, with HBA A directly connected to PS1 and HBA B directly connected to PS2; and (iv) four LUNs: a, b, c, and d. VS1 uses dedicated LUNs a and b while VS2 and VS3 share LUNs c and d. All VSs are to be capable of running on PS1 using HBA A and on PS2 using HBA B. This results in creation of six vHBAs: A1, A2, and A3 on HBA A (one each for each of the three VSs, respectively, when running on PS1), and B1, B2, and B3 on HBA B (one each for each of the three VSs, respectively, when running on PS2), with each vHBA assigned a unique WWPN. It also results in the following two SAGs: (i) SAG1, including VS1, LUNs a and b, HBAs A and B, and vHBAs A1 and B1; and (ii) SAG2, including VSs 2 and 3, LUNs c and d, HBAs A and B, and vHBAs A2, A3, B2, and B3.

Now suppose a SAG in a more complex server cluster of a more typical enterprise environment that includes a large number of VSs able to run on various PSs and on each PS using multiple HBAs to access storage devices via multiple SANs. For example, imagine a scenario with 1,000 VSs, each able to run on 20 PSs using 4 HBAs on each PS. Using the WWPN-generation approach of the previous example, this would result in 80,000 WWPNs (1,000 VSs×20 PSs×4 HBAs/PS). Accordingly, access control (zoning, LUN masking) must be set up for 80,000 WWPNs.

In some SAG embodiments for flexible deployment and migration of virtual servers with SAN-attached storage on a server cluster, given one or more VSs that shall be able to run on different PSs and shall be able to access a set of storage resources from each of these PSs using HBAs installed thereon, a SAG is created that includes: (i) the VSs that shall use the SAG to access a set of storage resources; (ii) the PSs on which the VSs shall be able to run; and (iii) the HBAs that shall be used on each PS. For each VS, a set of WWPNs is then created, one WWPN per the maximum number of paths (that is, HBAs) that the VS shall use on any PS. When a VS is deployed on a PS, a vHBA is instantiated on each HBA of the PS that the VS shall use, and one of the WWPNs is assigned to each vHBA. A set of additional WWPNs is created for each SAG and managed in a WWPN migration pool, to be dynamically assigned to VSs of that SAG when they are migrated from one PS to another. The size of the pool is defined by: (i) the maximum number of concurrent virtual server migrations to be supported; and (ii)

the maximum number of vHBAs (and thus WWPNs) a VS can consume on any PS in the cluster.

In some embodiments of the present invention: (i) one or more VSs shall be able to run on different hypervisors and, using HBAs that are installed on the underlying respective PS, shall be able to access a set of storage resources from each of these hypervisors, where a given hypervisor can be (a) installed directly on a PS, providing multiple VSs on that PS, or (b) installed on top of an underlying hypervisor, further virtualizing a VS provided by the underlying hypervisor into multiple, upper-level VSs (more than 2 levels of hypervisors, and accordingly levels of VSs, are possible); (ii) a SAG is created specifying the VSs that shall use the SAG to access a common set of storage resources and the HBA ports that shall be used on each hypervisor to access the storage resources; (iii) all the VSs which are members of a SAG must be provided with the same access capabilities to the storage resources, via the HBA ports of respective hypervisors; (iv) for each VS, a set of WWPNs is reserved based on the maximum number of paths (that is, HBAs) that the VS shall use on any hypervisor; (v) reserved WWPNs are assigned to the vHBAs that are created during activation of the VSs and will be logged in as initiators to an N_Port ID Virtualization (NPIV)-capable SAN fabric; and/or (vi) to maintain the same, consistent access capability for all VSs of a SAG, the WWPNs assigned to the VSs are suitably configured at the SAN subsystem level via zoning and LUN masking.

Some embodiments of the present invention recognize: (i) that ensuring access consistency of all the WWPNs (which are not being used for fibre logins and are free at the time of validation) helps to ensure smooth functioning of a SAG; (ii) that one of the methods to verify the access consistency of all the WWPNs reserved for VSs of a SAG is to sequentially verify each and every WWPN on every physical HBA port in a SAG; and/or (iii) that in large server cluster configurations, this sequential verification process could take a huge amount of time.

In light of the foregoing, some embodiments of the present invention include an optimized and efficient method to validate the access consistency of WWPNs in a SAG, wherein, for each SAG of interest: (i) each physical HBA port of each hypervisor is indexed, with the scope of the index being limited to each hypervisor; (ii) a number of buckets are created for the purpose of holding ports/WWPNs, one each per port in the set of the maximum number of physical HBA ports (HV_MAX_PORT_COUNT) that may be used on any hypervisor at any given point in time during the lifecycle of the SAG; and (iii) the ports are then grouped based on their index values (herein referred to as port indexes) such that ports with the same index are placed in the same bucket.

The following example illustrates the concept of HV_MAX_PORT_COUNT. Consider 6 hypervisors (H1, H2, H3, H4, H5 and H6) contributing ports to a SAG named SAG1. Further assume an actual number of physical HBA ports (P) on respective PSs (and hence available to the respective hypervisor on each PS for storage access) and their corresponding contribution (P*) to SAG1 (as defined during SAG construction), both as shown in Table 1.

TABLE 1

Determination of HV_MAX_PORT_COUNT for SAG1;
P = ports available and P* = ports in SAG1

| HYPERVISOR | P | P* |
|---|---|---|
| H1 | 5 | 2 |
| H2 | 4 | 4 |
| H3 | 6 | 3 |
| H4 | 2 | 2 |
| H5 | 3 | 2 |
| H6 | 3 | 3 |

As can be seen from the P* column of Table 1, H2 contributes the maximum number of ports to SAG1 of any hypervisor, so HV_MAX_PORT_COUNT=4. Notice that even though H3 has the maximum number of ports available (6), that is neither a factor for defining the number of buckets to be maintained nor for reserving the requisite number of WWPNs. Instead, HV_MAX_PORT_COUNT is based on the maximum number of physical ports included in the SAG definition that can be used by a single hypervisor within the SAG.

In some embodiments of the present invention: (i) the number of buckets increases when HV_MAX_PORT_COUNT increases; (ii) ports are removed from buckets when the ports are removed from the SAG; (iii) a bucket is removed from a SAG when there are no more ports in the SAG associated with that bucket; (iv) WWPNs are equally distributed among all the buckets; (v) each bucket forms a fixed association of a set of ports and a set of WWPNs such that WWPNs from a given bucket always perform fibre login over the same port of a hypervisor; (vi) validation of WWPNs is confined to the set of ports within a bucket; (vii) a further level of optimization is achieved by forming distinctive sets of WWPNs within each bucket and validating these sets in parallel on different ports in the same bucket in a round-robin fashion; and/or (viii) validation is performed in one or more of the following non-limiting circumstances: (a) proactively when SAG is created or modified; (b) whenever there is a change on the storage subsystem side (like LUN masking and so on) which can impact the storage visibility for the hosts; and/or (c) whenever there is a change on the SAN subsystem side (like zoning and so on) which can impact the storage visibility for the hosts.

Figure 6:
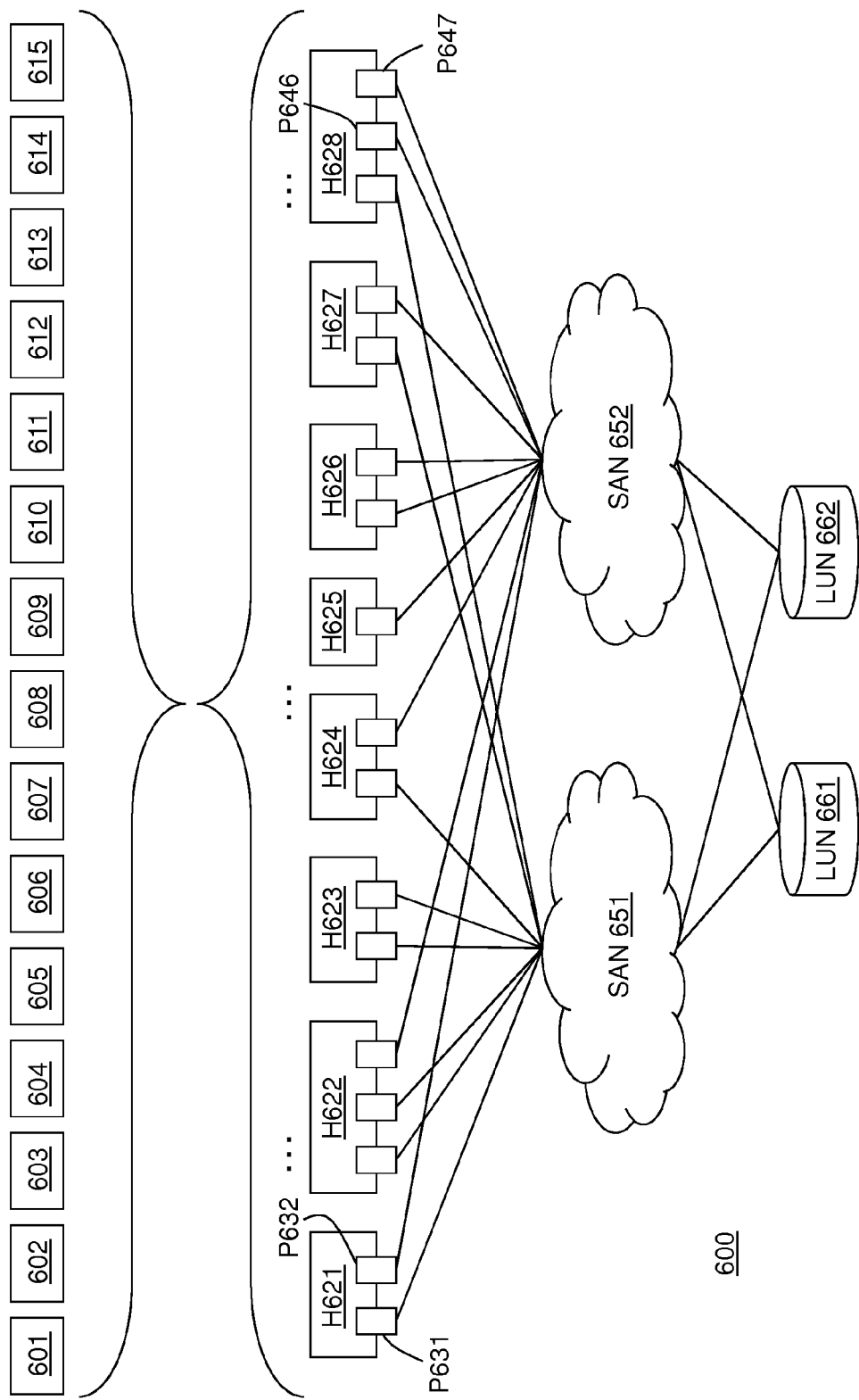
FIG. 6 is an architectural diagram of a second embodiment system according to the present invention.

Shown in FIG. 6 is SAG 600, an example setup useful for understanding the discussion that follows. SAG 600 includes: VSs 601 through 615; hypervisors H621 through H628; physical HBA ports P631 through P647; SANs 651 and 652; and LUNs 661 and 662. As can be seen from the Figure, the 8 hypervisors together have 17 physical ports, and no single hypervisor has more than 3 ports. (Note that the 17 physical HBA ports depicted in the Figure are only those participating in SAG 600—the actual number of physical HBA ports on each PS (not shown) and/or hypervisor could be greater. Also, each hypervisor runs on a different PS in this embodiment, though in general this need not be the case.) The 15 VSs are deployable and live migratable across any of the above hypervisors. SAG 600 is created to include these 15 VSs and 17 ports, wherein the number of planned concurrent migrations of VSs across hypervisors is designated to be 5.

In some embodiments of the present invention, the number of WWPNs generated for a SAG is determined by the following formula:

$$N_{WWPNs} = (V+M) \times P$$

where V=the number of VS(s) in a SAG, M=the maximum number of VS(s) that can be migrated concurrently, and P=HV_MAX_PORT_COUNT. For the scenario of FIG. 6, V=15, M=5, and P=3, giving $N_{WWPNs}=(15+5)\times 3=60$.

To understand this equation, note that in these embodiments it is expected that all the WWPNs reserved for a SAG should have access to the same set of storage resources. Now suppose the boundary case where all 15 VSs of FIG. 6 are hosted on H622, and 5 of them are going to be concurrently migrated to H628. This would require 15×3=45 WWPNs to support the 15 initially deployed VSs on H622 (which has 3 ports in the SAG), plus an additional 5×3=15 WWPNs to support the 5 migrating VSs (which will have active WWPNs on both the source and target hypervisors), for a total of 60 ports (note: this equation may slightly over-provision WWPNs in some practical cases, but, given the bucket creation rule of this example, it conveniently results in a number of WWPNs that is always a multiple of the number of buckets, and, in most practical cases, provisions a substantially minimal number of WWPNs). The 60 WWPNs allocated for these 60 ports are shown in Table 2. They are represented as 4-digit hexadecimal numbers for the sake of convenience.

TABLE 2

Allocation of WWPNs to SAG 600

| 0001 | 0002 | 0003 | 0004 | 0005 | 0006 |
|------|------|------|------|------|------|
| 0007 | 0008 | 0009 | 000A | 000B | 000C |
| 000D | 000E | 000F | 0010 | 0011 | 0012 |
| 0013 | 0014 | 0015 | 0016 | 0017 | 0018 |
| 0019 | 001A | 001B | 001C | 001D | 001E |
| 001F | 0020 | 0021 | 0022 | 0023 | 0024 |
| 0025 | 0026 | 0027 | 0028 | 0029 | 002A |
| 002B | 002C | 002D | 002E | 002F | 0030 |
| 0031 | 0032 | 0033 | 0034 | 0035 | 0036 |
| 0037 | 0038 | 0039 | 003A | 003B | 003C |

Verification of equivalent access of the above WWPNs to the storage resources of SAG 600 ensures the correct functionality of the SAG. Some embodiments of the present invention thus recognize: (i) that equivalent access can be verified by using each of these WWPNs as initiator WWPNs for VSs, performing a fibre login to the SAN and finding all LUNs (storage resource logical units) which are accessible through that WWPN; (ii) that as these WWPNs can be associated with any port in the SAG, the above verification has to be done on all the physical ports of the SAG for each WWPN; (iii) that successful verification of the above implies that the VSs in the SAG can have a consistent view of the LUNs irrespective of the hypervisors on which they might be running at any given time; but (iv) that in a large-scale environment, verifying each WWPN on each of the physical ports in a SAG can be time consuming. Continuing with the example of FIG. 6, 60 WWPNs would have to be verified on 17 ports to ensure the same access capability, for a total of 1,020 fibre logins that would have to be performed.

Some embodiments of the present invention therefore include a bucketization scheme organizing ports into buckets to verify the same access capability to storage resources in a more optimized way. In some such embodiments: (i) ports within each hypervisor are indexed; and (ii) ports with the same index on different hypervisors are put into the same bucket. Returning again to the example of FIG. 6, following this approach results in the 17 ports being placed into 3 different buckets, as shown in Table 3. For ease of reference, each hypervisor/port combination has been renamed to reflect its assigned port index. For example, H621/P631 is renamed H621-1, H621/P632 is renamed H621-2, H622/P633 is renamed H622-1, and so on.

TABLE 3

Organization of hypervisor ports by bucket for SAG 600;

| BUCKET 1 | BUCKET 2 | BUCKET 3 |
|----------|----------|----------|
| H621-1 | H621-2 | * |
| H622-1 | H622-2 | H622-3 |
| H623-1 | H623-2 | * |
| H624-1 | H624-2 | * |
| H625-1 | * | * |
| H626-1 | H626-2 | * |
| H627-1 | H627-2 | * |
| H628-1 | H628-2 | H628-3 |

* indicates no ports with this index are available in the respective PS/hypervisor Once the ports are bucketized, the reserved WWPNs can also be organized into buckets by being distributed equally across all the existing buckets. Table 4 continues the example of FIG. 6, where 60 WWPNs are reserved and allocated into the 3 created buckets after the bucketization of the physical ports. These 60 WWPNs are distributed across the 3 buckets, done evenly here for 20 WWPNs per bucket. In this example embodiment, the distribution of WWPN into buckets may be done in any order.

The idea remains to ensure consistent and uniform storage accessibility; that is, irrespective of the WWPNs assigned to each vHBA port of a VS and irrespective of the hypervisor the VS is deployed on, the storage resource access list for all VSs in the configuration should remain the same. One way to validate this would be to make the WWPNs from Table 2 perform fibre-channel login from each port of every hypervisor participating in SAG 600 and get the list of all visible storage resources (LUNs). The lists thus obtained from each fibre login should be identical. However, this approach is time-taking, resource consuming, and cumbersome, as a WWPN can perform fibre login over only one port at a time and hence each WWPN has to be checked on each port sequentially.

Bucketization of the ports and WWPNs helps simplify the validation process. It provides a fixed association between a group of ports and a group of WWPNs. The fixed association optimizes the storage access consistency validation of storage resources without violating the core of the SAG concept. Under this approach, verification of storage access consistency is performed on each port that has the same port index using the WWPNs within the same respective bucket.

For example, from Table 4 it can be seen that, using this approach, WWPN 000A can only login through Port 1 of any hypervisor. Similarly, WWPN 002A can only login through Port 3 of hypervisors 622 and 628. More generally in this example, at most 20 WWPNs are validated against each port having the same port index (and, having the same index, placed in the same bucket).

TABLE 4

Organization of hypervisor ports and WWPNs by bucket for SAG 600;

| BUCKET 1 | | BUCKET 2 | | BUCKET 3 | |
|----------|-------|----------|-------|----------|-------|
| Ports | WWPNs | Ports | WWPNs | Ports | WWPNs |
| H621-1 | 0001 | H621-2 | 0002 | * | 0003 |
| | 0004 | | 0005 | | 0006 |
| | 0007 | | 0008 | | 0009 |

TABLE 4-continued

Organization of hypervisor ports and WWPNs by bucket for SAG 600;

| BUCKET 1 | | BUCKET 2 | | BUCKET 3 | |
|---|---|---|---|---|---|
| Ports | WWPNs | Ports | WWPNs | Ports | WWPNs |
| H622-1 | 000A | H622-2 | 000B | H622-3 | 000C |
|  | 000D |  | 000E |  | 000F |
| H623-1 | 0010 | H623-2 | 0011 | * | 0012 |
|  | 0013 |  | 0014 |  | 0015 |
|  | 0016 |  | 0017 |  | 0018 |
| H624-1 | 0019 | H624-2 | 001A | * | 001B |
|  | 001C |  | 001D |  | 001E |
| H625-1 | 001F | * | 0020 | * | 0021 |
|  | 0022 |  | 0023 |  | 0024 |
|  | 0025 |  | 0026 |  | 0027 |
| H626-1 | 0028 | H626-2 | 0029 | * | 002A |
|  | 002B |  | 002C |  | 002D |
| H627-1 | 002E | H627-2 | 002F | * | 0030 |
|  | 0031 |  | 0032 |  | 0033 |
|  | 0034 |  | 0035 |  | 0036 |
| H628-1 | 0037 | H628-2 | 0038 | H628-3 | 0039 |
|  | 003A |  | 003B |  | 003C |

* indicates no ports with this index are available in the respective PS/hypervisor For a boundary case, suppose all 15 VSs are activated on H622 (which has the maximum number of participating ports in the set of hypervisors), and the maximum possible concurrent migrations (which is 5 VSs) are planned to be performed to H628 (which also has the maximum number of participating ports in the remaining set of target hypervisors). This would require that only 20 WWPNs be verified on each port (because there are 20 WWPNs in each bucket). This means that instead of 60 WWPNs×17 ports=1,020 fibre logins, only (20 WWPNs×8 ports)+(20 WWPNs×7 ports)+ (20 WWPNs×2 ports)=20 WWPNs×17 ports, or 340 fibre logins, would be necessary. (Irrespective of number of active VSs, validation in this example is always done for all $N_{WWPNs}=(V+M)\times P$ WWPNs periodically or as and when needed as per a specific implementation, all the ports are validated at provisioning time, and there is no source-target tagging for any port at that time. The scope of validation in this example is always at provisioning time or at the time of any modifications to the SAG, like adding or removing VSs or physical HBA ports.)

Some embodiments of the present invention recognize: (i) that the bucketization approach described above permits optimization of the FC login process; (ii) that the fibre channel login process can possibly be optimized in more ways than one; (iii) that in order to realize faster storage access validation, a parallel FC login process can be performed; and/or (iv) that within the bucketization scheme, such a process can be performed by grouping WWPNs against the number of physical HBA ports within the bucket.

For example, Bucket 1 of Table 4 has 8 physical HBA ports and 20 WWPNs. These 20 WWPNs are validated against each of the 8 ports. An FC login strategy performing these validations could be performed in multiple ways to achieve efficiency. One approach is as follows:

(i) Assign to all WWPNs in Bucket 1 indices from 1 to 8 corresponding to hypervisors H621 to H628. Similar logic holds for WWPNs in Buckets 2 and 3. However, because WWPNs in Bucket 2 cannot be assigned to Port 2 of H625, index 5 is skipped in this bucket. Likewise, because WWPNs in Bucket 3 can only be assigned to Port 3 of H622 and H628, all of the WWPNs in Bucket 3 are assigned hypervisor weights (that is, indexes) of either 2 or 8. This scenario is shown in Table 5 (Table 4 with indexes added).

TABLE 5

FC login strategy - assignment of indexes to WWPNs by bucket for SAG 600;
* indicates no ports with this index are available in the respective PS/hypervisor

| BUCKET 1 | | | BUCKET 2 | | | BUCKET 3 | | |
|---|---|---|---|---|---|---|---|---|
| Ports | Index | WWPNs | Ports | Index | WWPNs | Ports | Index | WWPNs |
| H621-1 | 1 | 0001 | H621-2 | 1 | 0002 | * | 2 | 0003 |
|  | 2 | 0004 |  | 2 | 0005 |  | 8 | 0006 |
|  | 3 | 0007 |  | 3 | 0008 |  | 2 | 0009 |
| H622-1 | 4 | 000A | H622-2 | 4 | 000B | H622-3 | 8 | 000C |
|  | 5 | 000D |  | 6 | 000E |  | 2 | 000F |
| H623-1 | 6 | 0010 | H623-2 | 7 | 0011 | * | 8 | 0012 |
|  | 7 | 0013 |  | 8 | 0014 |  | 2 | 0015 |
|  | 8 | 0016 |  | 1 | 0017 |  | 8 | 0018 |
| H624-1 | 1 | 0019 | H624-2 | 2 | 001A | * | 2 | 001B |
|  | 2 | 001C |  | 3 | 001D |  | 8 | 001E |
| H625-1 | 3 | 001F | * | 4 | 0020 | * | 2 | 0021 |
|  | 4 | 0022 |  | 6 | 0023 |  | 8 | 0024 |
|  | 5 | 0025 |  | 7 | 0026 |  | 2 | 0027 |
| H626-1 | 6 | 0028 | H626-2 | 8 | 0029 | * | 8 | 002A |
|  | 7 | 002B |  | 1 | 002C |  | 2 | 002D |
|  | 8 | 002E | H627-2 | 2 | 002F | * | 8 | 0030 |
| H627-1 | 1 | 0031 |  | 3 | 0032 |  | 2 | 0033 |
|  | 2 | 0034 |  | 4 | 0035 |  | 8 | 0036 |
| H628-1 | 3 | 0037 | H628-2 | 6 | 0038 | H628-3 | 2 | 0039 |
|  | 4 | 003A |  | 7 | 003B |  | 8 | 003C |

(ii) Create a list for each index in each bucket, saving each WWPN in its corresponding list (that is WWPNs are in the same list if and only if they are in the same bucket and bear the same index).

(iii) Create an empty queue, one for each bucket (that is, one for each of Ports 1, 2, and 3, up to HV_MAX_PORT_COUNT).

(iv) Place the lists in their respective bucket queue by port and by index. For example, the lists formed with WWPNs from Bucket 1 will all be queued up in Queue 1. Hence from Table 5, the queue for Port 1 has 8 members, that for Port 2 has 7 members, and the one for Port 3 has 2 members. The result of this process is shown in diagram 700 of FIG. 7.

Figure 7:
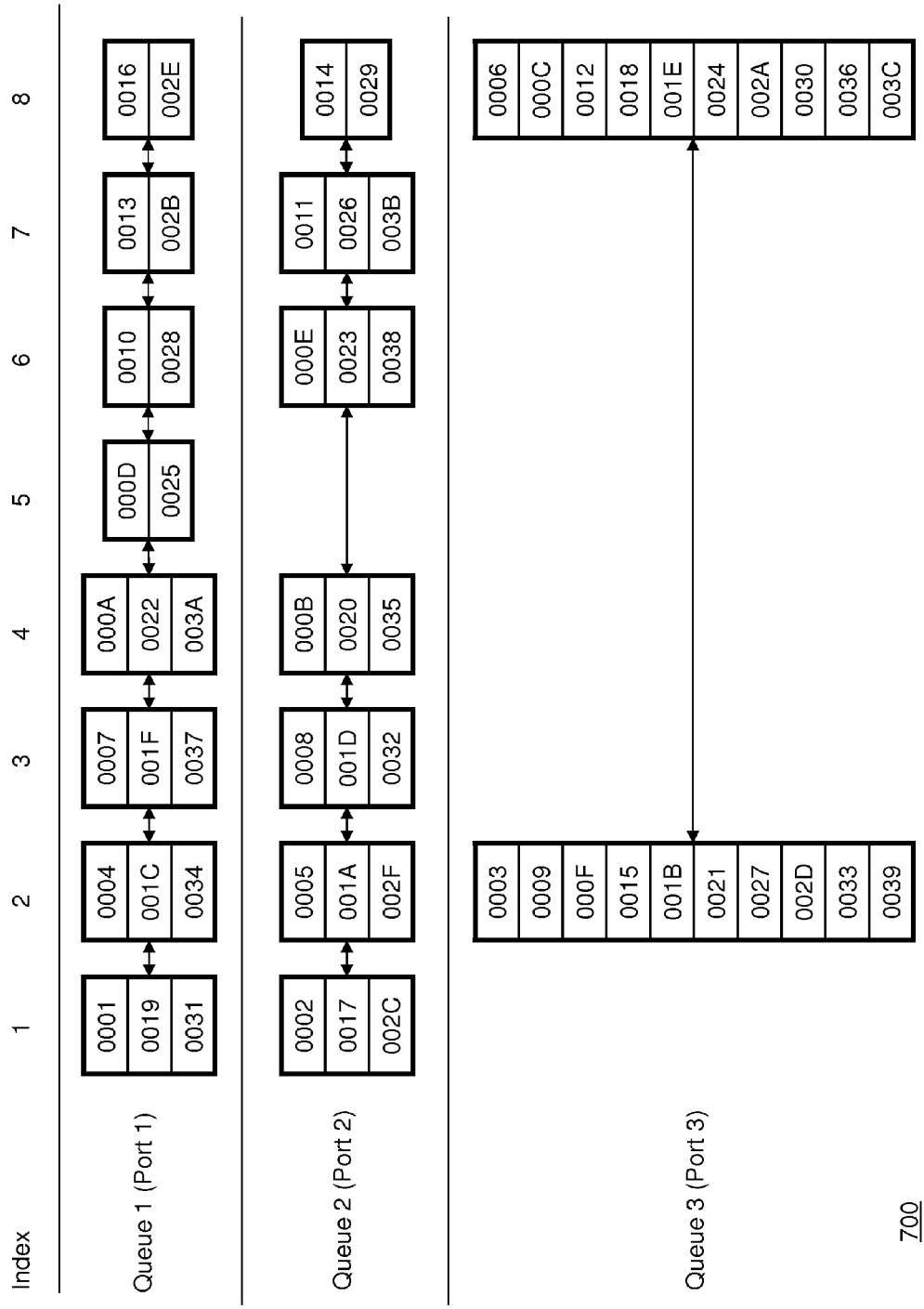
FIG. 7 is a queue diagram generated by and/or helpful in understanding the second embodiment system.

Using the arrangement presented in diagram 700 of FIG. 7, discovery can be simultaneously fired on all the ports of all the hypervisors of FIG. 6 as follows:

(i) Create a local copy of relevant queues for each applicable hypervisor. Because hypervisor H625 has just 1 port, it gets a local copy of Queue 1. Hypervisors H621, H623, H624, H626 and H627 have 2 ports each, so these 5 hypervisors each get local copies of Queues 1 and 2. Hypervisors H622 and H628 get local copies of all 3 queues, as they have 3 ports each.

(ii) Design original copies (that is, coordinate rearrangement of the elements of the various copies) of Queues 1, 2 and 3 such that no 2 simultaneous reads are possible for the same element (value) of a queue. However, simultaneous reads for different elements in a queue should be possible.

(iii) Perform the following (login) simultaneously: (a) pick one element (index) each for each hypervisor (having Port 1) from Queue 1 and perform fibre channel logins for all WWPNs in a given element through Port 1 of the corresponding hypervisor for which the element was chosen; (b) pick one element each for each hypervisor (having Port 2) from Queue 2 and perform fibre channel logins for all WWPNs in a given element through Port 2 of the corresponding hypervisor for which the element was chosen; (c) pick one element each for each hypervisor (having Port 3) from Queue 3 and perform fibre channel log-ins for all WWPNs in a given element through Port 3 of the corresponding hypervisor for which the element was chosen. In other words, for each bucket/port/queue, select for a given hypervisor a list in that queue not being selected for any other hypervisor and cycle through logins for each WWPN in that list. This could be done, for example, by cycling through the 3 WWPNs in the Index 1 list of Queue 1 on hypervisor H621-1 while simultaneously cycling through the 3 WWPNs in the Index 2 list of Queue 1 on hypervisor H622-1 and so on for each port on each hypervisor, in each case drawing from the appropriate queue.

(iv) Perform discovery for all logged-in WWPNs on all the hypervisors simultaneously. As and when discovery finishes for any port on any hypervisor, log out the logged-in WWPNs and remove the element containing the list of WWPNs that have just been verified from the local copy of the corresponding queue of that hypervisor. For instance, after cycling through the 3 WWPNs in the Index 1 list of Queue 1 on hypervisor H621-1, Index 1 is removed, leaving the lists associated with indexes 2-8 in Queue 1 with WWPNs still to be validated on that hypervisor's Port 1.

(v) Continue performing logins while there are elements in the local copies of the queues of any hypervisor.

Figure 8A:
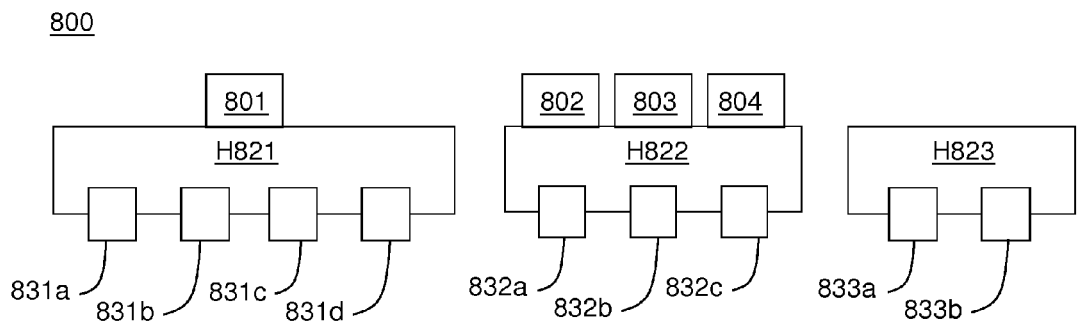
FIG. 8A is a first architectural diagram of a third embodiment system according to the present invention.

Shown in FIG. 8A is part of SAG 800. The parts of SAG 800 shown in FIG. 8A include: VSs 801, 802, 803, and 804; hypervisors H821, H822, and H823; and physical HBA ports 831a-d, 832a-c, and 833a-b. VS 801 runs on H821, while VSs 802, 803 and 804 run on H822 (no VSs are currently running on H823). SAG 800 will be used to illustrate how buckets are managed in some embodiments of the present invention when one or more ports are added to, or removed from, one or more hypervisors.

As can be seen in the Figure, the 3 hypervisors of SAG 800 have different numbers of ports participating in the SAG. H821 has 4 ports, H822 has 3 ports, and H823 has 2 ports, so HV_MAX_PORT_COUNT=4 and thus 4 buckets will be used to group WWPNs as previously explained. In SAG 800, no WWPNs are reserved for migration. Hence, using the formula for the number of WWPNs needed for the SAG presented earlier, $N_{WWPNs}=(V+M)\times P$, gives $N_{WWPNs}=(4+0)\times 4=16$ (to accommodate the boundary case for configuration of this SAG where all 4 VSs are to run on the 4-port H821). These 16 WWPNs are grouped into the 4 buckets as depicted in Table 6A (again, there is no particular requirement as to which WWPNs are assigned to which buckets).

TABLE 6A

Ports to be verified (VPs) and used for login (CP) per WWPN for SAG 800;
* indicates no ports are associated with the given WWPN for the respective function

| Bucket 1 | | | Bucket 2 | | | Bucket 3 | | | Bucket 4 | | |
|---|---|---|---|---|---|---|---|---|---|---|---|
| WWPN | CP | VPs | WWPN | CP | VPs | WWPN | CP | VPs | WWPN | CP | VPs |
| 01 | 831a | 831a 832a 833a | 02 | 831b | 831b 832b 833b | 03 | 831c | 831c 832c | 04 | 831d | 831d |
| 05 | 832a | 831a 832a 833a | 06 | 832b | 831b 832b 833b | 07 | 832c | 831c 832c | 08 | * | 831d |
| 09 | 832a | 831a 832a 833a | 10 | 832b | 831b 832b 833b | 11 | 832c | 831c 832c | 12 | * | 831d |
| 13 | 832a | 831a 832a 833a | 14 | 832b | 831b 832b 833b | 15 | 832c | 831c 832c | 16 | * | 831d |

The needed validations are also shown in Table 6A. WWPNs in the first column under each bucket identifier are configured to perform fibre login over the PORT_ID in the second column (CP). However, they are verified over all PORT_IDs in the third column (VPs). The 13 WWPNs associated with a CP represent the virtual and physical port identifiers, respectively, used by the VSs shown in FIG. 8A for storage access.

Figure 8B:
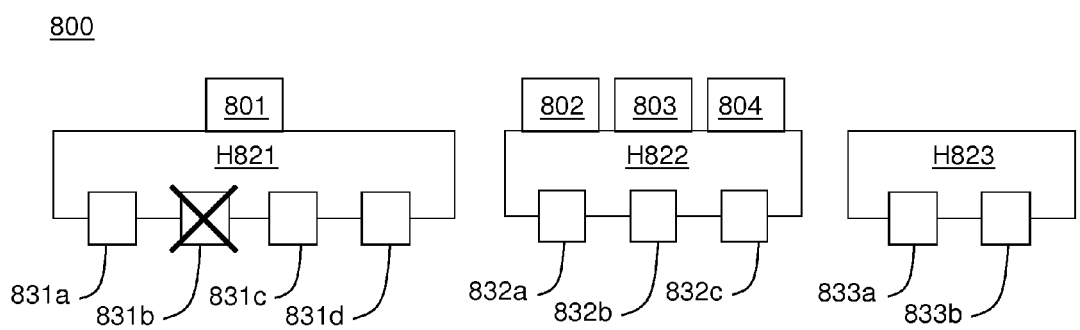
FIG. 8B is a second architectural diagram of the third embodiment system.

To demonstrate how a removed port is handled under this bucket management scheme, suppose port 831b of hypervisor H821 is removed from SAG 800, as shown in FIG. 8B. Now login and validation of WWPN 02 (as well as validation by the other WWPNs in the same bucket) over this port no longer hold. There may be multiple ways of managing the resulting set of WWPNs and ports. However, note that removal of 831b reduces HV_MAX_PORT_COUNT to 3. Thus to conform to the relation between HV_MAX_PORT_COUNT and the number of buckets, in this example the number of buckets is likewise reduced to 3, as shown in Table 6B. To avoid wastage of WWPNs, WWPN 02 has been replaced with WWPN 04 and port 831b has been replaced with port 831*d* to arrive at a conforming distribution. Note that re-activation of VSs 802, 803, and/or 804 on H822 (or activation of VS 801 on H822 instead of on H821, in addition to VSs 802, 803, and 804) may not work because the WWPNs in Bucket 2 have not been validated on port 831*d*. (Again, note that in this example validation is preferably performed up front for readiness purposes and to ensure that LUN masking/zoning is proper on the storage/SAN side. Doing this at runtime will provide an instantaneous picture, but it may take a long time to fix any discrepancies discovered and establish the desired storage accessibility.)

TABLE 6B

Ports to be verified (VPs) and used for login (CP) per WWPN for SAG 800 after removal of port 831b from the SAG

| Bucket 1 | | | Bucket 2 | | | Bucket 3 | | |
|---|---|---|---|---|---|---|---|---|
| WWPN | CP | VPs | WWPN | CP | VPs | WWPN | CP | VPs |
| 01 | 831a | 831a | 04(!) | 831d | 831d | 03 | 831c | 831c |
|  |  | 832a |  |  | 832b |  |  | 832c |
|  |  | 833a |  |  | 833b |  |  |  |
| 05 | 832a | 831a | 06 | 832b | 831d | 07 | 832c | 831c |
|  |  | 832a |  |  | 832b |  |  | 832c |
|  |  | 833a |  |  | 833b |  |  |  |
| 09 | 832a | 831a | 10 | 832b | 831d | 11 | 832c | 831c |
|  |  | 832a |  |  | 832b |  |  | 832c |
|  |  | 833a |  |  | 833b |  |  |  |
| 13 | 832a | 831a | 14 | 832b | 831d | 15 | 832c | 831c |
|  |  | 832a |  |  | 832b |  |  | 832c |
|  |  | 833a |  |  | 833b |  |  |  |

Tables 7A-D present a more elaborate depiction of port/WWPN movement as and when a port or VS is added to or removed from SAG 800, beginning again with the configurations of FIG. 8A and Table 6A. To begin, Table 7A shows an alternative configuration to that shown in Table 6B after port 831*b* is removed. In this example, WWPN 02 is no longer used but the buckets themselves remain unchanged. Instead, references to port 831*b* have simply been removed from Bucket 2. The reason for not removing the bucket is to keep things simple and avoid the need to redistribute the remaining WWPNs, hence eliminating the possibility of re-validation while the existing WWPNs might be in use.

TABLE 7A

Ports to be verified (VPs) and used for login (CP) per WWPN for SAG 800 after removal of port 831b from the SAG; * indicates no ports are associated with the given WWPN for the respective function

| Bucket 1 | | | Bucket 2 | | | Bucket 3 | | | Bucket 4 | | |
|---|---|---|---|---|---|---|---|---|---|---|---|
| WWPN | CP | VPs | WWPN | CP | VPs | WWPN | CP | VPs | WWPN | CP | VPs |
| 01 | 831a | 831a | 02 | * | 832b | 03 | 831c | 831c | 04 | 831d | 831d |
|  |  | 832a |  |  | 833b |  |  | 832c |  |  |  |
|  |  | 833a |  |  |  |  |  |  |  |  |  |
| 05 | 832a | 831a | 06 | 832b | 832b | 07 | 832c | 831c | 08 | * | 831d |
|  |  | 832a |  |  | 833b |  |  | 832c |  |  |  |
|  |  | 833a |  |  |  |  |  |  |  |  |  |
| 09 | 832a | 831a | 10 | 832b | 832b | 11 | 832c | 831c | 12 | * | 831d |
|  |  | 832a |  |  | 833b |  |  | 832c |  |  |  |
|  |  | 833a |  |  |  |  |  |  |  |  |  |
| 13 | 832a | 831a | 14 | 832b | 832b | 15 | 832c | 831c | 16 | * | 831d |
|  |  | 832a |  |  | 833b |  |  | 832c |  |  |  |
|  |  | 833a |  |  |  |  |  |  |  |  |  |

Following the removal of port 831*b*, VS 804 is removed, resulting in the configuration shown in Table 7B. Note that the last row has been removed with respect to Table 7A, and the WWPNs previously used by (or reserved for) VS 804 have been freed up.

TABLE 7B

Ports to be verified (VPs) and used for login (CP) per WWPN for SAG 800 after removal of port 831b and VS 804 from the SAG; * indicates no ports are associated with the given WWPN for the respective function

| Bucket 1 | | | Bucket 2 | | | Bucket 3 | | | Bucket 4 | | | Free |
|---|---|---|---|---|---|---|---|---|---|---|---|---|
| WWPN | CP | VPs | WWPN | CP | VPs | WWPN | CP | VPs | WWPN | CP | VPs | WWPNs |
| 01 | 831a | 831a | 02 | * | 832b | 03 | 831c | 831c | 04 | 831d | 831d | 13 |
|  |  | 832a |  |  | 833b |  |  | 832c |  |  |  | 14 |
|  |  | 833a |  |  |  |  |  |  |  |  |  | 15 |
| 05 | 832a | 831a | 06 | 832b | 832b | 07 | 832c | 831c | 08 | * | 831d | 16 |
|  |  | 832a |  |  | 833b |  |  | 832c |  |  |  |  |
|  |  | 833a |  |  |  |  |  |  |  |  |  |  |

TABLE 7B-continued

Ports to be verified (VPs) and used for login (CP) per WWPN for SAG 800
after removal of port 831b and VS 804 from the SAG;
* indicates no ports are associated with the given WWPN for the respective function

| Bucket 1 | | | Bucket 2 | | | Bucket 3 | | | Bucket 4 | | | Free |
|---|---|---|---|---|---|---|---|---|---|---|---|---|
| WWPN | CP | VPs | WWPN | CP | VPs | WWPN | CP | VPs | WWPN | CP | VPs | WWPNs |
| 09 | 832a | 831a 832a 833a | 10 | 832b | 832b 833b | 11 | 832c | 831c 832c | 12 | * | | 831d |

TABLE 7C

Ports to be verified (VPs) and used for login (CP) per WWPN for SAG 800
after removal of port 831b, VS 804, and port 831d from the SAG;
* indicates no ports are associated with the given WWPN for the respective function

| Bucket 1 | | | Bucket 2 | | | Bucket 3 | | | Bucket 4 | | | Free |
|---|---|---|---|---|---|---|---|---|---|---|---|---|
| WWPN | CP | VPs | WWPN | CP | VPs | WWPN | CP | VPs | WWPN | CP | VPs | WWPNs |
| 01 | 831a | 831a 832a 833a | 02 | * | 832b 833b | 03 | 831c | 831c 832c | | | | 13 14 15 |
| 05 | 832a | 831a 832a 833a | 06 | 832b | 832b 833b | 07 | 832c | 831c 832c | | | | 16 04 08 |
| 09 | 832a | 831a 832a 833a | 10 | 832b | 832b 833b | 11 | 832c | 831c 832c | | | | 12 |

Following the removal of VS 804, port 831*d* is removed, resulting in the configuration shown in Table 7C. Note that Bucket 4 is now empty and its WWPNs have been added to the free list, as the WWPNs originally used (or reserved) for use with the fourth port of any hypervisor have been freed up.

Following the removal of port 831*d*, VS 804 is added back into the SAG (again on hypervisor H822), resulting in the configuration shown in Table 7D. Note that 3 WWPNs were allocated from the free list to support this addition.

TABLE 7D

Ports to be verified (VPs) and used for login (CP) per WWPN for SAG 800
after removal of port 831b, VS 804, and port 831d from the SAG
followed by the re-addition of VS 804 to hypervisor H822;
* indicates no ports are associated with the given WWPN for the respective function

| Bucket 1 | | | Bucket 2 | | | Bucket 3 | | | Bucket 4 | | | Free |
|---|---|---|---|---|---|---|---|---|---|---|---|---|
| WWPN | CP | VPs | WWPN | CP | VPs | WWPN | CP | VPs | WWPN | CP | VPs | WWPNs |
| 01 | 831a | 831a 832a 833a | 02 | * | 832b 833b | 03 | 831c | 831c 832c | | | | 16 04 08 |
| 05 | 832a | 831a 832a 833a | 06 | 832b | 832b 833b | 07 | 832c | 831c 832c | | | | 12 |
| 09 | 832a | 831a 832a 833a | 10 | 832b | 832b 833b | 11 | 832c | 831c 832c | | | | |
| 13 | 832a | 831a 832a 833a | 14 | 832b | 832b 833b | 15 | 832c | 831c 832c | | | | |

Some embodiments of the present invention may include one, or more, of the following features, characteristics and/or advantages: (i) ensure consistent storage accessibility for one or more groups of virtual servers with SAN-attached storage on a server cluster; (ii) do not require server support for migration of WWPNs among systems; (iii) do not require a user to manage individual vHBAs; (iv) reflect SAN configuration on the system; (v) can be applied in an iSCSI environment; (vi) permit consistent visibility of LUNs by all the host ports that are part of the same SAG, as appropriate, whether the LUNs are grouped together or exposed as individual LUNs (as the expectation from SAG is that all the WWPNs reserved by a SAG should see the same set of LUNs irrespective of the bucket where they are going to land and also irrespective of the host that is going to use these WWPNs for storage access); (vii) provide that the same changes are seen consistently from all the WWPNs of a SAG as and when LUNs are added to or removed from the storage subsystem; and/or (viii) permit or perform re-triggering of the validation to confirm (vii), making sure that any LUN added or removed is seen by the WWPNs consistently and catching any configuration/provision issues in the storage subsystem or the SAN (in some embodiments, this is a base requirement of a SAG, and adding/removing ports to/from a SAG has a direct impact on the number of WWPNs to be reserved).

Some embodiments of the present invention may include one, or more, of the following features, characteristics and/or advantages: (i) recognizing that validation can be done just prior to VS migration, but that the issue with that approach is that it is more a reactive approach—that is, if the validation fails at the time of migration, the corrective action requires the server administrator to go after SAN and storage administrators to verify their configuration in order to fix the issues, and until then the migration can't be performed—proactively that validate whether all the WWPNs given by a server administrator are configured properly in the SAN and storage subsystem by the respective administrators; (ii) use pro-active validation to greatly reduce the probability of the validation failure that is done just before migration; (iii) trigger and/or perform pro-active validation for every change to the system that can affect the previous validation results; (iv) use bucketization of a set of WWPNs and physical adapter ports of a PS for validating storage access consistency of those WWPNs and creating a fixed association between a group of WWPNs and group of physical adapter ports; and/or (v) optimize storage access validation by doing validation simultaneously on different (virtual) ports of different physical ports.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Resource access group (RAG): a defined collection of networked resources that includes, but need to necessarily be limited to: (i) a set of one or more resources to be accessed; (ii) a set of virtual resources that should all have consistent access to the resources of (i); (iii) a set of interchangeable physical resources on which the virtual resources run; (iv) a set of physical ports through which the virtual resources access the resources of (i); and (v) a set of virtual ports through which the virtual resources access the physical ports of (iv).

Storage access group (SAG): a RAG wherein one set of resources is a set of virtual machines and another set of resources is a set of SAN-attached storage devices.

Physical resource: as used herein, any resource that sits below the virtualization level of the virtual resource(s) of a RAG and supports these virtual resources, such as a physical server or hard disk, a hypervisor, or a lower-level virtual server or hard disk.

Physical port: as used herein, any port that sits below the virtualization level of the virtual ports of a RAG and supports these virtual ports, such as a physical port or a lower-level virtual port.

What is claimed is:

1. A method for verifying access consistency to a set of accessed resources over a set of virtual ports, the method comprising:

provisioning a resource access group, from a pool of resources, including: (i) a set of virtual resources; (ii) a set of physical resources; and (iii) a set of physical ports;

based on provisioning the set of physical ports, automatically provisioning a set of virtual ports for the resource access group;

automatically determining a set of accessed resources, wherein the set of accessed resources are a subset of the pool of resources that are provisioned to the resource access group;

automatically allocating a group of physical ports in the set of physical ports and a group of virtual ports in the set of virtual ports to each bucket of a plurality of buckets, wherein each allocated group of physical ports and virtual ports indicates their respective bucket in an associated identifier, wherein each virtual port in the set of virtual ports and each physical port in the set of physical ports is placed into exactly one bucket, and at least two physical ports in a group of physical ports are allocated to a common bucket;

automatically determining which buckets of the plurality of buckets are accessed by the resource access group; and for only the determined buckets accessed by the resource access group, automatically verifying that the associated set of accessed resources are accessible through each virtual port allocated to the determined respective bucket over each physical port allocated to that determined respective bucket.

2. The method of claim 1 wherein:
the set of virtual resources is a set of virtual servers; and
the set of accessed resources is a set of storage area network (SAN)-attached storage devices.

3. The method of claim 1 wherein the set of virtual ports are part of a Fibre Channel-based network.

4. The method of claim 1 wherein each virtual port in the set of virtual ports and each physical port in the set of physical ports is placed into exactly one bucket.

5. The method of claim 1 wherein:
the set of virtual ports is provisioned to include a selected number of virtual ports; and the selected number of virtual ports is effectively determined by:
computing a base value as: (i) the number of virtual resources in the set of virtual resources; plus (ii) a number of supported concurrent migrations of virtual resources from one physical resource in the set of physical resources to another physical resource in the set of physical resources; and
multiplying the base value by a number of physical ports, which number of physical ports: (i) is based on a first physical resource in the set of physical resources having a number of physical ports from the set of physical ports at least as great as any other physical resource in the set of physical resources; and (ii) is equal to the number of physical ports from the set of physical ports that the first physical resource has.

6. The method of claim 1 wherein:
the number of buckets is determined by a first physical resource in the set of physical resources having a number of physical ports from the set of physical ports at least as great as any other physical resource in the set of physical resources; and
the number of buckets is equal to the number of physical ports from the set of physical ports that the first physical resource has.

7. The method of claim 6 wherein physical ports are allocated to buckets by:
assigning a unique index number from one up to the number of physical ports on a given physical resource for each physical port from the set of physical ports on the given physical resource; and
assigning to the same bucket all physical ports from the set of physical ports that have the same index number.

8. The method of claim 1 wherein, within at least one bucket, the verifying includes:
dividing the virtual ports into two or more groups;
pairing each group with a unique physical port in the bucket;
verifying access of the virtual ports in a first group through the first group's paired physical port in parallel with verifying access of the virtual ports in a second group through the second group's paired physical port; and
changing the pairings of groups with physical ports and repeating the verifications with the new pairings until each virtual port in each group has been verified over each physical port in the bucket.

9. A computer program product for verifying access consistency to a set of accessed resources over a set of virtual ports, the computer program product comprising a computer readable storage medium, which is not a propagation signal, having program instructions embodied therewith, the program instructions executable by a computing device to cause the device to:
provision a resource access group from a pool of resources, including: (i) a set of virtual resources; (ii) a set of physical resources; and (iii) a set of physical ports; based on the provisioned set of physical ports, automatically provision a set of virtual ports for the resource access group;
automatically determine a set of accessed resources, wherein the set of accessed resources are a subset of the pool of resources that are provisioned to the resource access group;
automatically allocate a group of physical ports in the set of physical ports and a group of virtual ports in the set of virtual ports to each bucket of a plurality of buckets, wherein each allocated group of physical ports and virtual ports indicates their respective bucket in an associated identifier, wherein
each virtual port in the set of virtual ports and each physical port in the set of physical ports is placed into exactly one bucket, and
at least two physical ports in a group of physical ports are allocated to a common bucket;
automatically determine which buckets of the plurality of buckets are accessed by the resource access group; and
for only the determined buckets accessed by the resource access group, automatically verify that the associated set of accessed resources are accessible through each virtual port allocated to the determined respective bucket over each physical port allocated to the determined respective bucket.

10. The product of claim 9 wherein: the set of virtual resources is a set of virtual servers; and the set of accessed resources is a set of storage area network (SAN)-attached storage devices.

11. The product of claim 9 wherein each virtual port in the set of virtual ports and each physical port in the set of physical ports is placed into exactly one bucket.

12. The product of claim 9 wherein: the set of virtual ports is provisioned to include a selected number of virtual ports; and the virtual ports is effectively determined by:
computing a base value as: (i) the number of virtual resources in the set of virtual resources; plus (ii) a number of supported concurrent migrations of virtual resources from one physical resource in the set of physical resources to another physical resource in the set of physical resources; and
multiplying the base value by a number of physical ports, which number of physical ports: (i) is based on a physical resource in the set of physical resources having a number of physical ports from the set of physical ports at least as great as any other physical resource in the set of physical resources; and (ii) is equal to the number of physical ports from the set of physical ports that the physical resource has.

13. The product of claim 9 wherein:
the number of buckets is determined by a first physical resource in the set of physical resources having a number of physical ports from the set of physical ports at least as great as any other physical resource in the set of physical resources; and
the number of buckets is equal to the number of physical ports from the set of physical ports that the first physical resource has.

14. The product of claim 13 wherein physical ports are allocated to buckets by:
assigning a unique index number from one up to the number of physical ports on a given physical resource for each physical port from the set of physical ports on the given physical resource; and
assigning to the same bucket all physical ports from the set of physical ports that have the same index number.

15. A computer system for verifying access consistency to a set of accessed resources over a set of virtual ports, the computer system comprising:

a processor; and a computer readable storage medium;

wherein:

the processor is structured, located, connected and programmed to ran program instructions stored on the computer readable storage medium; and the program instructions cause the system to:

provision a resource access group from a pool of resources, including: (i) a set of virtual resources; (ii) a set of physical resources; and (iii) a set of physical ports;

based on the provisioned set of physical ports, automatically provision a set of virtual ports for the resource access group;

automatically determine a set of accessed resources, wherein the set of accessed resources are a subset of the pool of resources that are provisioned to the resource access group;

automatically allocate a group of physical ports in the set of physical ports and a group of virtual ports in the set of virtual ports to each bucket of a plurality of buckets, wherein each allocated group of physical ports and virtual ports indicates their respective bucket in an associated identifier, wherein each virtual port in the set of virtual ports and each physical port in the set of physical ports is placed into exactly one bucket, and at least two physical ports in a group of physical ports are allocated to a common bucket;

automatically determine which buckets of the plurality of buckets are accessed by the resource access group; and for only the determined buckets accessed by the resource access group, automatically verify that the associated set of accessed resources are accessible through each virtual port allocated to the determined respective bucket over each physical port allocated to the determined respective bucket.

16. (Previously Amended) The system of claim 15 wherein:

the set of virtual resources is a set of virtual servers; and the set of accessed resources is a set of storage area network (SAN)-attached storage devices.

17. The system of claim 15 wherein each virtual port in the set of virtual ports and each physical port in the set of physical ports is placed into exactly one bucket.

18. The system of claim 15 wherein: the set of virtual ports is provisioned to include a selected number of virtual ports; and the selected number of virtual ports is effectively determined by:

computing a base value as: (i) the number of virtual resources in the set of virtual resources; plus (ii) a number of supported concurrent migrations of virtual resources from one physical resource in the set of physical resources to another physical resource in the set of physical resources; and multiplying the base value by a number of physical ports, which number of physical ports: (i) is based on a first physical resource in the set of physical resources having a number of physical ports from the set of physical ports at least as great as any other physical resource in the set of physical resources; and (ii) is equal to the number of physical ports from the set of physical ports that the first physical resource has.

19. The system of claim 15 wherein:

the number of buckets is determined by a first physical resource in the set of physical resources having a number of physical ports from the set of physical ports at least as great as any other physical resource in the set of physical resources; and the number of buckets is equal to the number of physical ports from the set of physical ports that the first physical resource has.

20. The system of claim 19 wherein physical ports are allocated to buckets by:

assigning a unique index number from one up to the number of physical ports on a given physical resource for each physical port from the set of physical ports on the given physical resource; and assigning to the same bucket all physical ports from the set of physical ports that have the same index number.

* * * * *